March 4, 1952 W. L. STOUT 2,587,918
SCREEN LEVELING DEVICE FOR HARVESTERS
Filed May 18, 1948 2 SHEETS—SHEET 1
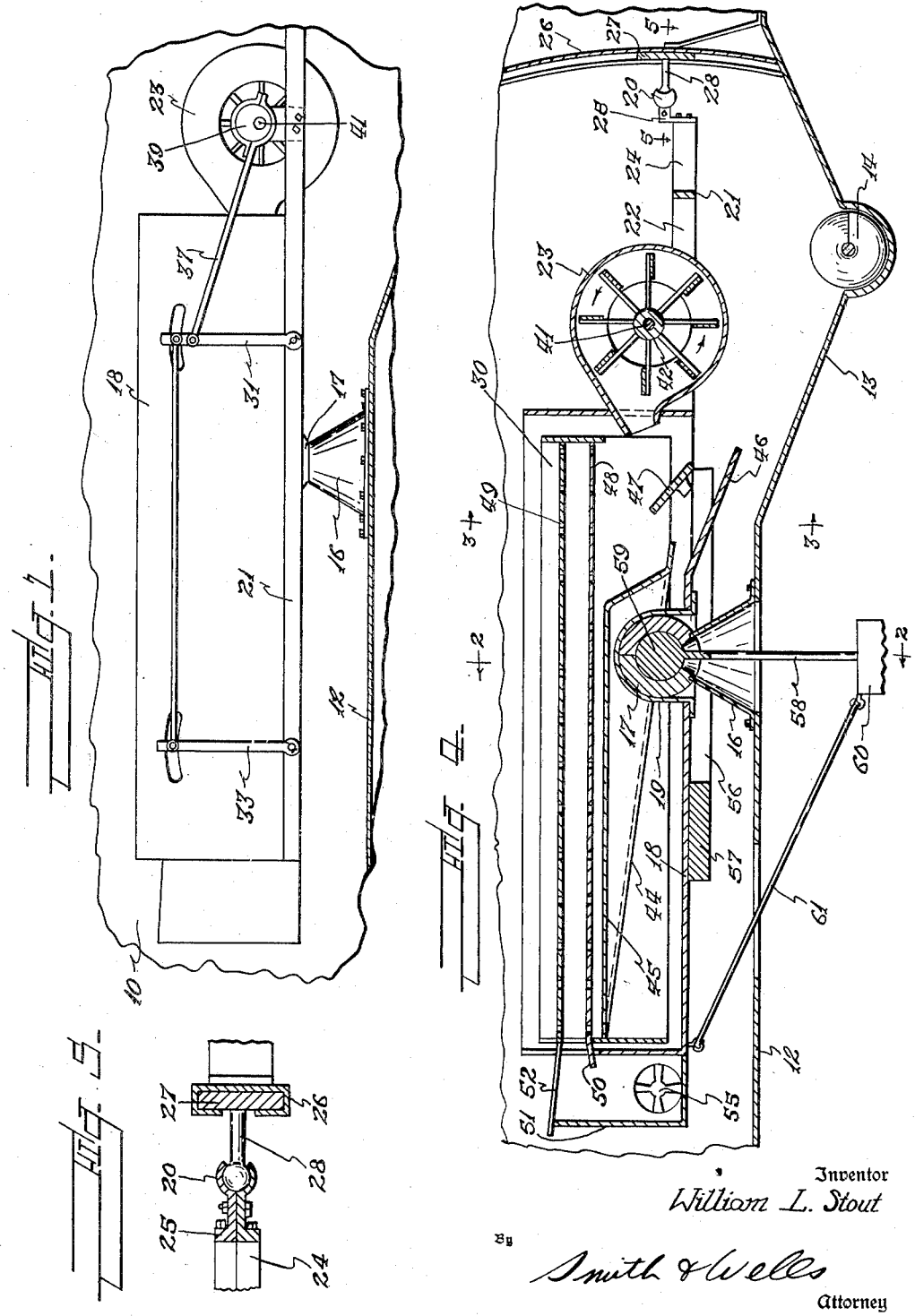
Inventor
William L. Stout
By Smith & Wells
Attorney March 4, 1952 W. L. STOUT 2,587,918
SCREEN LEVELING DEVICE FOR HARVESTERS
Filed May 18, 1948 2 SHEETS—SHEET 2
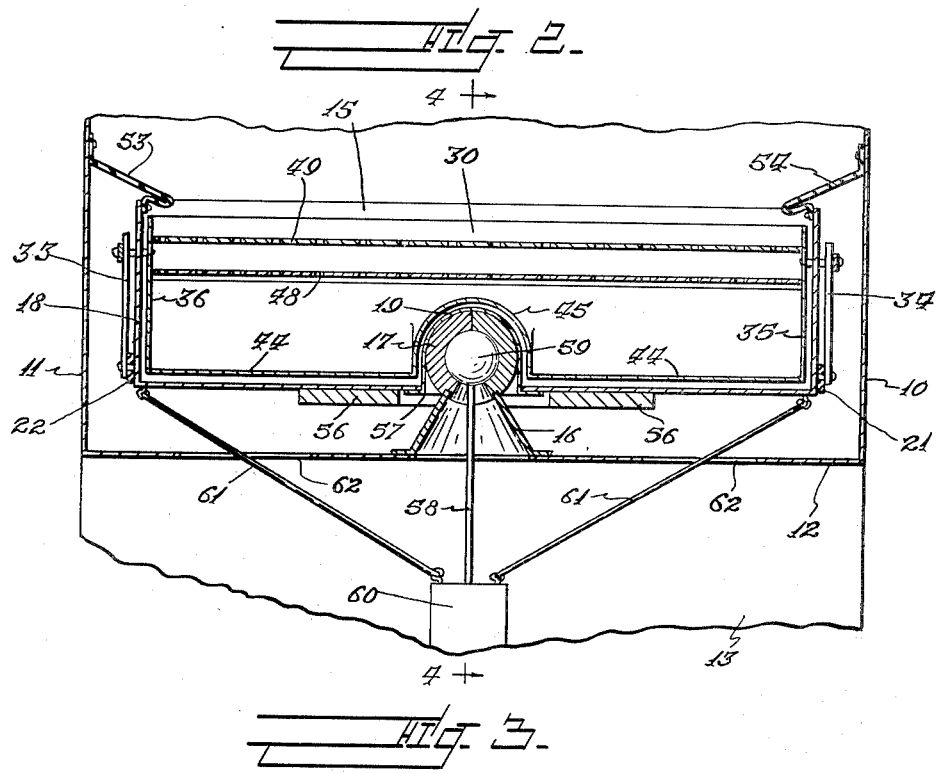
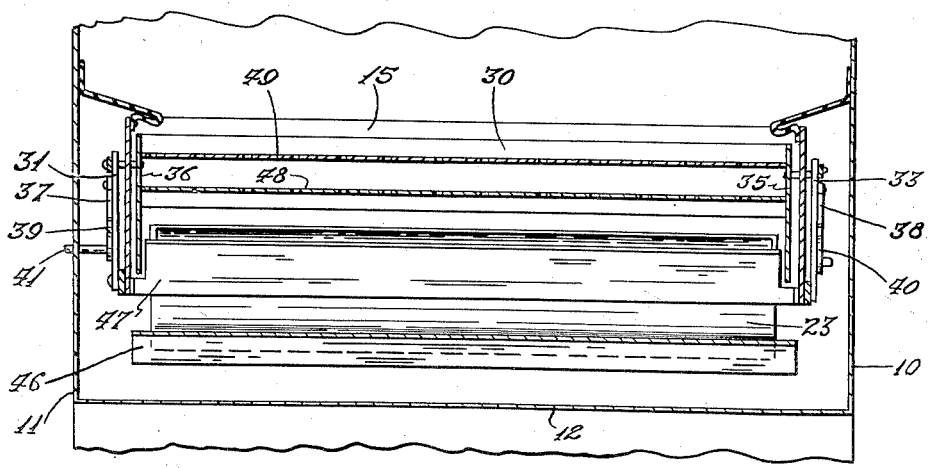
INVENTOR.
William L. Stout
BY
Smith & Wells Patented Mar. 4, 1952

2,587,918

UNITED STATES PATENT OFFICE 2,587,918

SCREEN LEVELING DEVICE FOR HARVESTERS

William L. Stout, Clarkston, Wash.

Application May 18, 1948, Serial No. 27,693

2 Claims. (Cl. 209—416)

My present invention relates to improvements in a screen leveling device for harvesters.

One of the difficult problems in combined harvesting machines lies in taking care of the grain when the harvester machine travels over terrain that is not level. Much of the crop area is on rolling or hilly ground. The harvester tilts both sidewise and endwise and in so doing causes the grain or seed to pile up or distribute itself unevenly on the screens where separation of the grain or seed from the chaff or straw takes place. A great many devices have been utilized in the past to take care of these conditions, and to my knowledge, none of them have been particularly successful in taking care of the tilting of the screens in all directions. The purpose of my invention is to provide a novel mounting for the screen and its supporting shoe and the associated mechanism for vibrating the screen whereby the leveling takes place automatically regardless of the direction in which the harvester is tilted.

My invention contemplates the provision in a combined harvester of a complete screening unit, including the vibrating mechanism and the fan, together with a suitable ball mounting that enables the entire unit to tilt in any direction upon its ball mounting, together with a pendulum or weight that maintains the screens of the unit in the proper level condition. This construction necessarily involves also the provision of means whereby rotation of the screening unit in a horizontal direction about the ball mounting is prevented, so that, the screening unit will, at all times, remain properly aligned with the shell or housing of the harvester and out of contact with the side walls thereof.

The novel features that I consider characteristic of my invention are set forth with particularity in the appended claims. The invention, however, both as to its organization and its method of operation, together with additional objects and advantages thereof, will best be understood from the following description of a specific embodiment when read in connection with the accompanying drawings in which:

Figure 1 is a side view of the screening unit as it appears when mounted in a housing of a harvester unit;

Figure 2 is a cross sectional view taken through a screening unit at the point of mounting;

Figure 3 is another cross sectional view taken substantially on the line 3—3 of Figure 1;

Figure 4 is a longitudinal sectional view through the screening unit taken substantially on the line 4—4 of Figure 2; and Figure 5 is an enlarged sectional view taken substantially on the line 5—5 of Figure 4.

Referring now in detail to the drawings, my invention is shown embodied in a harvester, the housing of which comprises side walls 10 and 11, a bottom wall 12 and end and top walls (not shown). The bottom wall 12 of the housing is shown with the customary depressed portion 13, at the bottom of which a cross conveyor trough 14 is provided for carrying the collected grain to an elevator at the side of the harvester. The devices for feeding the cut crop to the screening unit and the elevator mechanism have not been shown since they form no part of the present invention and may be of any well known type.

My invention is embodied in a screening unit 15 which is supported in its entirety upon a pedestal 16 carried by the harvester housing. The pedestal terminates at the top in a ball or sphere 17. My improved screen unit is made up of a supporting housing 18 which has a socket 19 extending up from the bottom thereof and formed to a spherical surface to ride upon the top of the ball 17. The housing 18 is secured between two side frame members 21 and 22 which project endwise beyond the housing and provide a mounting at one end of the housing for a fan casing 23. The side frame members 21 and 22 are extended beyond the fan housing and joined together to provide a single forwardly extending bar 24. At the free end of the bar 24, I provide an upwardly extending post 25 which has a spherical socket 20 at the top thereof. The spherical socket 20 has its center the same distance above the frame members 21 and 22 as the center of the ball 17.

A curved channel 26 is rigidly mounted in the housing of the harvester with its open side facing toward the ball 17, the curvature of the channel being about the center of the ball 17 on an arc of a circle. A shoe 27 is curved like the channel and is slidable up and down in the channel. This shoe has a rod 28 projecting into the socket 20 at the end of the bar 24. It is believed to be evident from the foregoing description that if the bar 24 rocks up and down about the ball 17 as a pivot, the shoe 27 will move up and down in the channel 26. The socket 20 permits lateral rocking of the bar about the rod 28.

The housing 18 carries a screening shoe 30 within it. This shoe is supported on four arms 31, 32, 33 and 34 that are pivoted on the outside of the housing 18 near the ends thereof and extended upwardly to a point adjacent the top of the screening shoe. The housing 18 has arcuate slots through which horizontal portions of the supporting arms 31, 32, 33 and 34 extend. The horizontal portions of the arms are pivotally secured to the side walls 35 and 36 of the screen shoe 30.

The two forward arms 31 and 32 are connected by links 37 and 38 to cranks 39 and 40 that are provided on a shaft 41. The shaft 41 also operates a fan 42. Any suitable means not shown providing a flexible drive may be utilized for supplying power to the fan shaft 41. Preferably I employ a flexible shaft leading to a suitable power unit on the side of the harvester in order that the flexible shaft may operate the fan 42 and the cranks 39 and 40 in all positions of the screening unit 15 with respect to the harvester housing.

The screening shoe itself has a sloping bottom wall 44 which slopes downwardly toward the fan in order that the seeds and grain passing through the screens will flow toward the depressed part of the harvester housing. The bottom wall 44 has a raised central portion 45 which extends from the end of the screening shoe most remote from the fan over the ball 17 in spaced relation to the socket 19 so that the endwise vibration of the shoe may take place.

I provide a guide plate 46 beneath the forward end of the sloping bottom of the screening shoe so as to direct the seeds forwardly and downwardly into the cross conveyor trough in the bottom of the harvester housing. The fan casing 23 has its outlet duct 47 opening into the front end of the housing 18 so as to direct a blast of air upwardly and rearwardly into the screening shoe. Screens 48 and 49 are mounted in the screening shoe, the lower screen 48 being a separating screen and the upper screen being a chaffing screen such as is commonly used in harvesters of this character. The separating screen 48 has a lip 50 at its rear end for discharging material which does not pass the screen into a tailings collector 51 on the rear end of the housing 18. The usual fingers 52 are provided at the rear end of the chaffing screen for carrying lighter particles and straw over the tailings collector to the usual straw outlet conveyor (not shown). The sides of the screening shoe are provided with flexible strips 53 and 54 which are quite loose and are extended to the sides of the harvester housing to prevent chaff and the like from falling over the sides of the screening shoe into the housing 18. The tailings collector may have a fan unit shown at 55 for removing the tailings gathered therein.

It will be noted that the only support for the entire screening unit is the ball 17. The front end of the bar 24 and its connection with the curved channel 2b serves merely to prevent horizontal rotation of the screening unit 15 within the housing of the harvester. The screening unit 15 is free to rock, within limits, in any direction about the ball 17. It is obvious that, with varying loads of grain on the screens and with the vibration of the screening shoe, it is necessary to provide additional means to overcome the tendency of these factors to tilt the screening unit 15 out of horizontal position. I accomplish this correction by providing weights such as 56 and 57 properly distributed on the bottom of the housing 18. These weights may be made sufficient to overcome the tendencies for unbalance of the screening unit 15. In addition to these weights 56 and 57, I prefer also to provide a pendulum rod 58 with a smaller ball 59 pivoted within the larger ball 17 on the same center. The rod 58 carries a weight 60 at its lower end. This weight may desirably be below the bottom of the harvester housing as shown. It is connected by rods 61 to the rear corners of the housing 18 and may desirably be also connected in a like manner to the forward corners of the housing 18 if desired. The rods 61 pass through suitable openings provided at 62 in the bottom of the harvester housing.

The weight 60 and the weights 56 and 57 cooperate to maintain the screening unit 15 in horizontal position regardless of how the harvester housing may be tilted in passing over hilly ground. This screening unit and mounting is not intended to replace leveling devices which are utilized in hillside harvesting to raise one side of the harvester higher than the other. It does however, take care of the lesser shifts in the level of the harvester which cannot be compensated for with the harvester leveling device. The leveling of the screening unit embodying my invention takes place immediately and automatically without any attention from the operator of the machine. It does not interfere in the slightest with harvesting on level ground.

It is believed that the nature and advantages of my invention will be apparent from the foregoing description. Having thus described my invention, I claim:

1. In a harvester, a pedestal, a ball on the pedestal, a screening unit suspended on the ball for universal movement, said unit including a vibrating screen, a housing therefor, and a fan adjacent to the housing operable to blow air through said screen, weight means connected with the support below the ball for holding the housing level, and means for preventing horizontal turning movement of the unit on the ball, said means comprising a bar fixed to the screening unit, a guide fixed on the housing and curved about the center of the ball as an axis, a member slidably mounted by said guide and a ball and socket joint connecting the bar to said member.

2. In a harvester, a pedestal, a ball on the pedestal, a screening unit suspended on the ball for universal movement, said unit including a vibrating screen, a housing therefor, and a fan adjacent to the housing operable to blow air through said screen, said ball having a spherical interior socket opening downward, a pendulum having a ball mounted in said interior socket and means connecting the pendulum to the housing for causing them to move together.

WILLIAM L. STOUT.

REFERENCES CITED

The following references are of record in the file of this patent:

UNITED STATES PATENTS

| Number | Name | Date |
| --- | --- | --- |
| 509,082 | Heald | Nov. 21, 1893 |
| 995,167 | Michaelsen | June 13, 1911 |
| 1,035,193 | Hovland | Aug. 13, 1912 |
| 1,064,440 | Brown | June 10, 1913 |
| 1,122,803 | Rhodes | Dec. 29, 1914 |
| 2,134,792 | McLarry | Nov. 1, 1938 |
| 2,266,805 | Ronning | Dec. 23, 1941 |
| 2,500,448 | Bozarth | Mar. 14, 1950 |